United States Patent
Nevruz

[11] Patent Number: 5,847,266
[45] Date of Patent: Dec. 8, 1998

[54] RECOVERY BOILER LEAK DETECTION SYSTEM AND METHOD

[75] Inventor: Albert A. Nevruz, Lawrenceville, N.J.

[73] Assignee: Union Camp Patent Holding, Inc., Wayne, N.J.

[21] Appl. No.: 713,850

[22] Filed: Sep. 13, 1996

[51] Int. Cl.[6] .............................. G01M 3/08; F22D 7/42; F22D 1/00; F22B 37/54

[52] U.S. Cl. ........................ 73/40.5 R; 237/8 R; 60/667; 122/382

[58] Field of Search .............................. 237/8 R; 60/667; 122/382; 73/40.5 R, 452, 53.03

[56] References Cited

U.S. PATENT DOCUMENTS

| | | | |
|---|---|---|---|
| 4,428,328 | 1/1984 | Ratliff | 122/396 |
| 4,462,319 | 7/1984 | Larsen | 110/238 |
| 4,497,283 | 2/1985 | LaSpisa et al. | 122/451.1 |
| 4,777,009 | 10/1988 | Singh et al. | 376/211 |
| 4,796,466 | 1/1989 | Farmer . | |
| 4,811,389 | 3/1989 | Balch . | |
| 5,148,775 | 9/1992 | Peet | 122/451 R |
| 5,320,967 | 6/1994 | Avallone et al. | 436/50 |
| 5,363,693 | 11/1994 | Nevruz | 73/40.5 R |

*Primary Examiner*—Michael Brock
*Assistant Examiner*—Jay L. Politzer
*Attorney, Agent, or Firm*—Synnestvedt & Lechner

[57] ABSTRACT

An improvement is disclosed for a boiler leak system that (a) measures fluid input into the recovery boiler system, (b) measures fluid output from the recovery boiler system, and (c) calculates fluid leakage loss based on an average difference between the measured fluid input and output values. The improvement increases the accuracy and responsiveness of calculating and interpreting the difference between the input and output fluid flow of the boiler. One aspect of the invention is an improved method which includes (1) compensating for the effects of boiler drum swelling and shrinking; (2) using multiple time frames to calculate the average differences between input and output such that a balance is struck between a highly responsive leak indication (short time frame) and a highly accurate leak indication (longer time frame); and/or (3) indicating a leak only after a predetermined certain sequence of significant differences between input and output is reached. Other aspects of the invention involve an apparatus and system for performing the above method.

20 Claims, 3 Drawing Sheets

RECOVERY BOILER LEAK DETECTION SYSTEM AND METHOD

BACKGROUND OF THE INVENTION

1. Field of the Invention

This invention relates broadly to the field of leak detection for high pressure containment systems. More specifically, this invention relates to an improved system and method for detecting steam leakage from boiler tubes and other areas of black liquor recovery boilers for the paper industry.

2. Background

The economics of kraft pulping depend heavily on the safe, continuous operation of black liquor recovery boilers. In addition to their role in the regeneration of pulping chemicals, recovery boilers generate a large proportion of the steam required for mill wide operations. Despite the efforts of paper mills, insurance companies, and boiler manufactures, smelt-water expulsions caused by boiler tube leaks continue to pose a threat to normal boiler operations.

Methods to detect water leaks in recovery boilers have been proposed and tested by researchers for several years. Most leak detection schemes monitor the total airborne or structural acoustic energy levels within the boiler to determine if a leak is present. Nevertheless, such acoustic leak detection strategies face significant limitations. These limitations include the interference presented by high background noise levels, the attenuation of acoustic energy occurring within the boiler, and the limited durability of acoustic sensors in the harsh environment of the boiler.

A recent improvement of acoustic leak detection systems, developed by Westvaco Corporation, utilizes spectral analysis techniques to overcome most of the inherent limitations of other acoustic leak detection schemes. This system is described in the July 1990 edition of the TAPPI Journal. While the Westvaco system appears to be an improvement over previous generations of acoustic leak detection systems, it is still, to some extent, subject to the above identified disadvantages of acoustic leak detection technology. Moreover, all acoustic leak detection systems are expensive to purchase, deploy and maintain.

The applicant previously disclosed a leak detection system in U.S. Pat. No. 5,363,693, incorporated herein by reference, which addresses the long and unfilled need in the industry for leak detection in a chemical recovery boiler system, which is less expensive, more accurate, and less suspectable to interference from background noise than commercially available acoustic leak detection systems. The basic method includes the steps of (a) measuring fluid input into the recovery boiler system, (b) measuring fluid output from the recovery boiler system, and (c) calculating fluid leakage loss based on the difference between the measured fluid input and output values. If the difference is determined to be significant, an alarm condition is indicated.

Although this leak detection system represents a marked improvement over existing acoustic methods, a need always exists for improved accuracy and responsiveness. The present invention addresses this need.

SUMMARY OF THE INVENTION

The present invention improves upon a boiler leak system that (a) measures fluid input into the recovery boiler system, (b) measures fluid output from the recovery boiler system, and (c) calculates fluid leakage loss based on an average difference between the measured fluid input and output values. The improvement is aimed at increasing the accuracy and responsiveness of calculating and interpreting the difference between the input and output fluid flow of the boiler. One aspect of the invention is an improved method which includes (1) compensating for the effects of boiler drum swelling and shrinking; (2) using multiple time frames to calculate the average differences between input and output such that a balance is struck between a highly responsive leak indication (short time frame) and a highly accurate leak indication (longer time frame); and/or (3) indicating a leak only after a predetermined sequence of significant differences between input and output is reached.

According to a second aspect of the invention, an apparatus is disclosed for detecting leakage from a boiler system. The apparatus includes (a) a mechanism for measuring fluid input into the recovery boiler system, (b) a mechanism for measuring fluid output from the recovery boiler system, and (c) a mechanism for calculating fluid leakage loss based on the difference between the measured fluid input and output values. Again, the present invention improves the accuracy of the leak detection by further including a mechanism for compensating for boiler drum swelling and shrinking, a mechanism for using multiple time frames in which to calculate the difference between input and output, and/or a mechanism for indicating a leak only after a predetermined sequence of significant differences between input and output is reached.

According to a third aspect of the invention, a computer system is disclosed for detecting leakage from a boiler system. The basic system includes instructional means for (a) measuring fluid input into the recovery boiler system, (b) measuring fluid output from the recovery boiler system, and (c) calculating fluid leakage loss based on the difference between the measured fluid input and output values. The system further includes instructional means for compensating for boiler drum swelling and shrinking, for using multiple time frames in which to calculate the difference between input and output, and/or for indicating a leak only after a predetermined sequence of significant differences between input and output is reached.

The present invention provides an improved leak detection system for black liquor recovery boilers which is less expensive than commercially available acoustic leak detection systems.

The present invention also provides a leak detection system which is more accurate than any system which is commercially available.

Additionally, the invention provides an improved leak detection system which is less susceptible to interference from ambient noise levels than the acoustic type of leak detection systems heretofore known and used.

The invention further provides an improved leak detection system which is more durable than systems presently in use.

DETAILED DESCRIPTION OF THE PRESENT INVENTION

Figure 1:
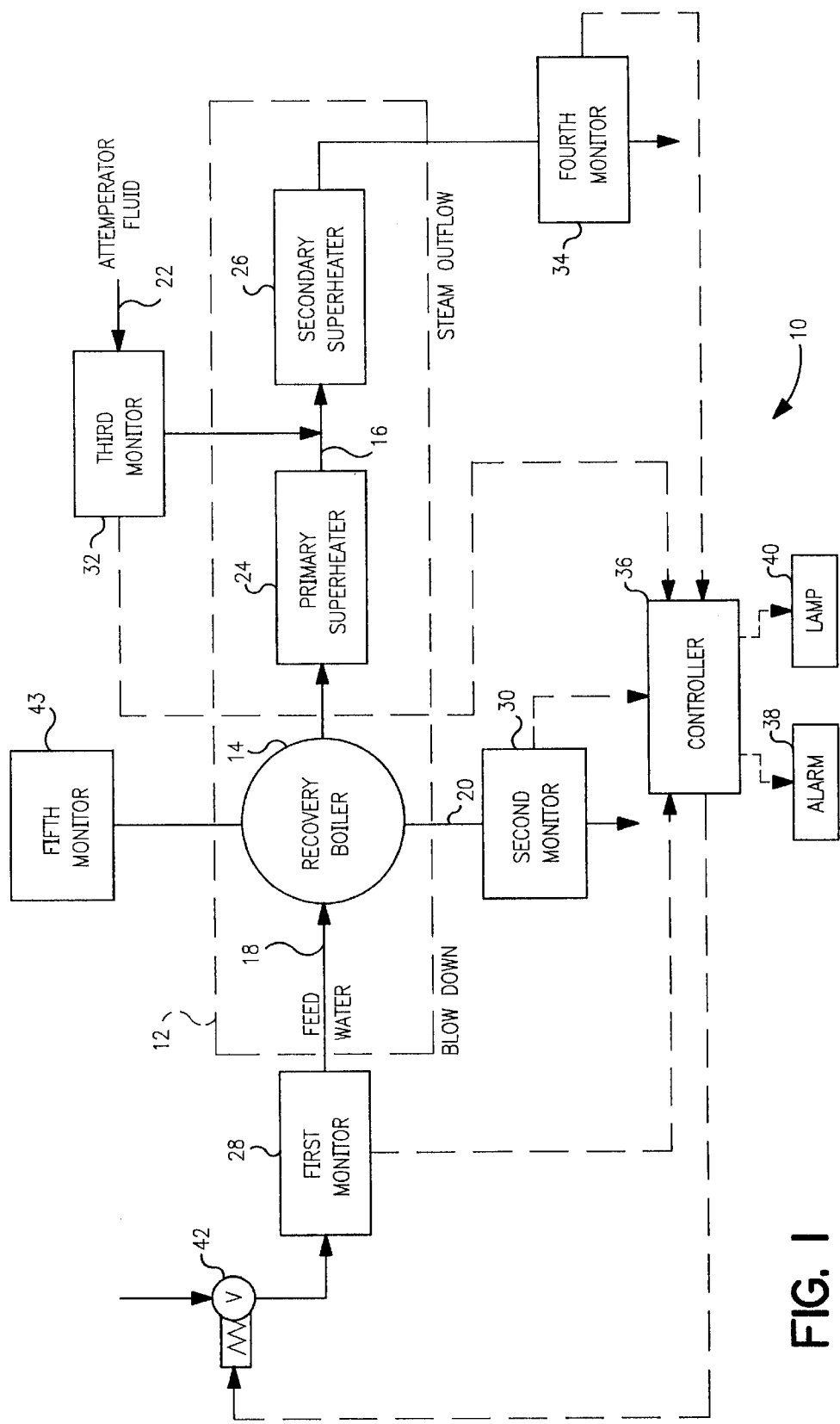
FIG. 1 is a schematic diagram depicting a leak detection system according to a preferred embodiment of the invention.

Referring now to the drawings, wherein like reference numerals designate corresponding structure throughout the views, and referring in particular to FIG. 1, a system 10 for detecting leakage from a chemical recovery boiler system 12 of the type which includes a recovery boiler drum 14 and associated steam output piping 16 is shown. Recovery boiler system 12 typically includes a feed water line 18 for supplying water to the recovery boiler drum 14 and an outlet line 20 for "blow-down" flow. Boiler system 12 further includes steam output piping 16, which typically leads to a turbine for electricity generation. An inflow line 22 for introducing attemperator fluid, usually water, into the steam piping 16 is also illustrated in FIG. 1. The purpose of the attemperator fluid is to cool down steam which has been heated beyond a predetermined level. Primary and secondary superheaters 24, 26 may also be positioned in the steam output line 16.

A system 10 according to the preferred embodiment of the invention includes a first monitor 28 that interposed within the feed water line 18 for measuring the mass flow of feed water into the recovery boiler drum 14. A second monitor 30 is interposed in the blowdown output line 20 for measuring the mass flow of blow-down which may be expelled from the recovery boiler drum 14. A third monitor 32 is interposed in the attemperator fluid inflow line 22 for measuring the mass flow of attemperator fluid into the steam output piping 16. A fourth monitor 34 is provided in the outflow portion of steam piping 16 for measuring the mass output from the steam piping 16. A fifth monitor 43 is operatively connected to the boiler drum 14 for measuring the level of fluid in the drum, herein referred to as the "drum level". The monitors 28, 30, 32, 34, and 43 are all preferably electronic in nature, and all are constructed and arranged to report electronically to a controller 36, as is schematically depicted in FIG. 1. Controller 36 in turn provides control signals to alarm 38 and, optionally, to a warning lamp 40. Controller 36 further provides a control signal to electronically control a two-position shutoff valve 42, which is interposed in feed water line 18.

As will become apparent from the description of the operation of the preferred embodiment of the invention given below, the invention involves conceptualizing a control volume encompassing the entire recovery boiler system 12, monitoring the mass flow in to and out of that control volume, and thus determining the flow of steam leakage which must necessarily be occurring within the recovery boiler system 12. This is preferably carried out calculating long and short term statistics for the drum balance of mass flow for various time frames, taking into consideration boiler drum swelling and shrinking, and testing to determine if there is a significant difference between short term and long term averages for a given time frame which could be attributed to recovery boiler leakage.

During operation of the recovery boiler system 12, the monitors 28, 30, 32, 34 report continuously to controller 36, which samples such data periodically, preferably about every 5 seconds. From this data, controller 36 calculates a drum balance value DB expressed in units of mass per unit time. This calculation, depicted as Block 101 in the flowchart illustrated in FIG. 2, may be expressed as follows:

DB=Feed Water Flow+Attemperator Flow−(Steam Flow+Blow Down Flow)     Equation (1)

According to a preferred embodiment of the invention, the accuracy of the drum balance calculation is improved by compensating for the swelling and shrinking of the boiler drum 14 caused by pressure changes in the system 10 and other factors. The swelling and shrinking of the boiler drum can conceal or erroneously suggest a leak. That is, when a boiler swells, its volume increases and retains more fluid. This gives the indication that the amount of fluid entering the boiler is less than the fluid exiting, which therefore suggests a leak. Conversely, when the boiler shrinks, its capacity is diminished. This results in increased fluid relative to the boiler system. If a leak exists, the increased fluid may serve to mask it since the fluid output may not change or even increase vis a vis the fluid input. Therefore, a more accurate drum balance can be calculated by compensating for boiler shrinking/swelling.

To this end, the present invention draws a relationship between drum balance and drum level. It has been found that drum level provides a simple and accurate correlation to drum balance, but other variables such as system pressure and temperature can be used individually or in combination to provide an indication of drum balance. Theoretically, the drum level and drum balance should be mirror images of one another—as the drum balance increases, drum level should drop and visa versa. Based on this relationship, the controller 34 receives a signal from monitor 43 and calculates a compensated drum balance ($DB_C$) using the following equation:

$$DB_C = DB - DB_P \qquad \text{Equation (2)}$$

wherein DB is calculated according to Equation (1), and $DB_P$ is the compensation factor based on drum level. The compensation factor has the following correlation equation:

$$DB_P = a + DL * b \qquad \text{Equation (3)}$$

wherein a is a moving intercept, b is a moving slope for a particular set of data, and DL is the drum level. It should be understood that the compensation factor should have a maximum magnitude below the desired leak detection sensitivity—otherwise, it could mask a leak.

In one embodiment, the correlation equation is generated using neural network logic. The newest neural systems known in the art can train themselves to predict process behavior using on-line data. Using neural lines correlation techniques therefore enables the compensation factor to be periodically updated, for example every 5 seconds, to account for fluctuations caused by boiler swelling and shrinking in the drum balance, and thereby minimize erroneous measurements. Although neural networks provide a powerful tool by which to generate the correlation equation, it should be understood that other traditional correlation techniques can be used. Moreover, it is anticipated that future correlation techniques used to predict one variable based on another variable, or a group of variables, will find application in this leak detection system.

Figure 2:
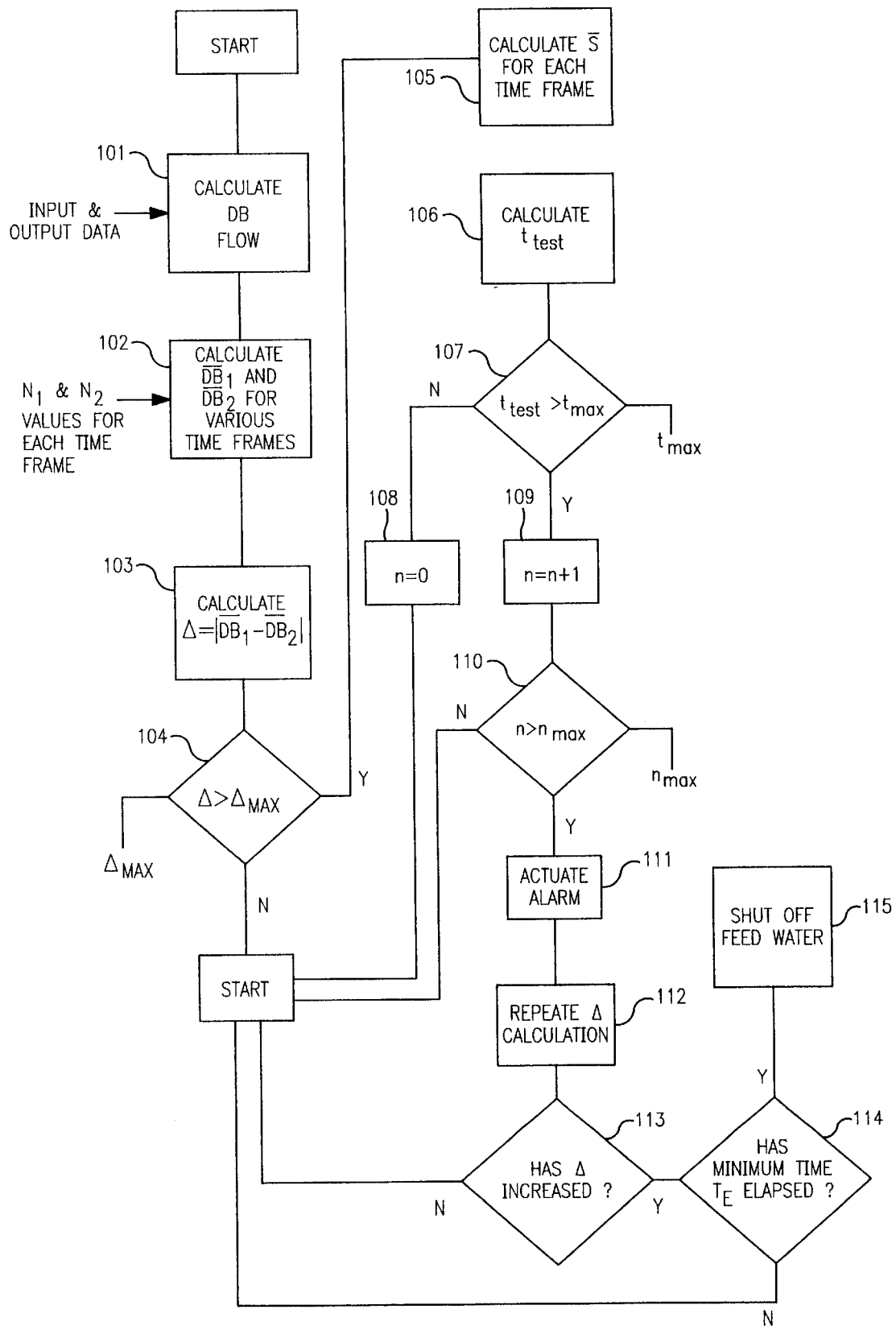
FIG. 2 is a flow chart depicting operation of the embodiment of the invention which is illustrated in FIG. 1.

According to a preferred embodiment, controller 36 uses a comparison of long term sampling and short term sampling in its statistical analysis of the data received from the monitors 28, 30, 32, 34 as shown in Block 102 of FIG. 2. As represented below in equation (4) and (5), controller 36 calculates short term and long term drum balance averages $\overline{DB_1}$ and $\overline{DB_2}$ periodically, for each sample, wherein Ts represents current time in seconds, $N_1$ represents the number of samples included in the short term average, and $N_2$ refers to the number of samples included in the long term average:

$$\overline{DB_1} = \frac{\sum\limits_{i=T_s-N_1}^{N_1} DB(i)}{N_1} \qquad \text{Equation (4)}$$

$$\overline{DB_2} = \frac{\sum_{i=T_s-N_2}^{N_2} DB(i)}{N_2}$$ Equation (5)

Figure 3:
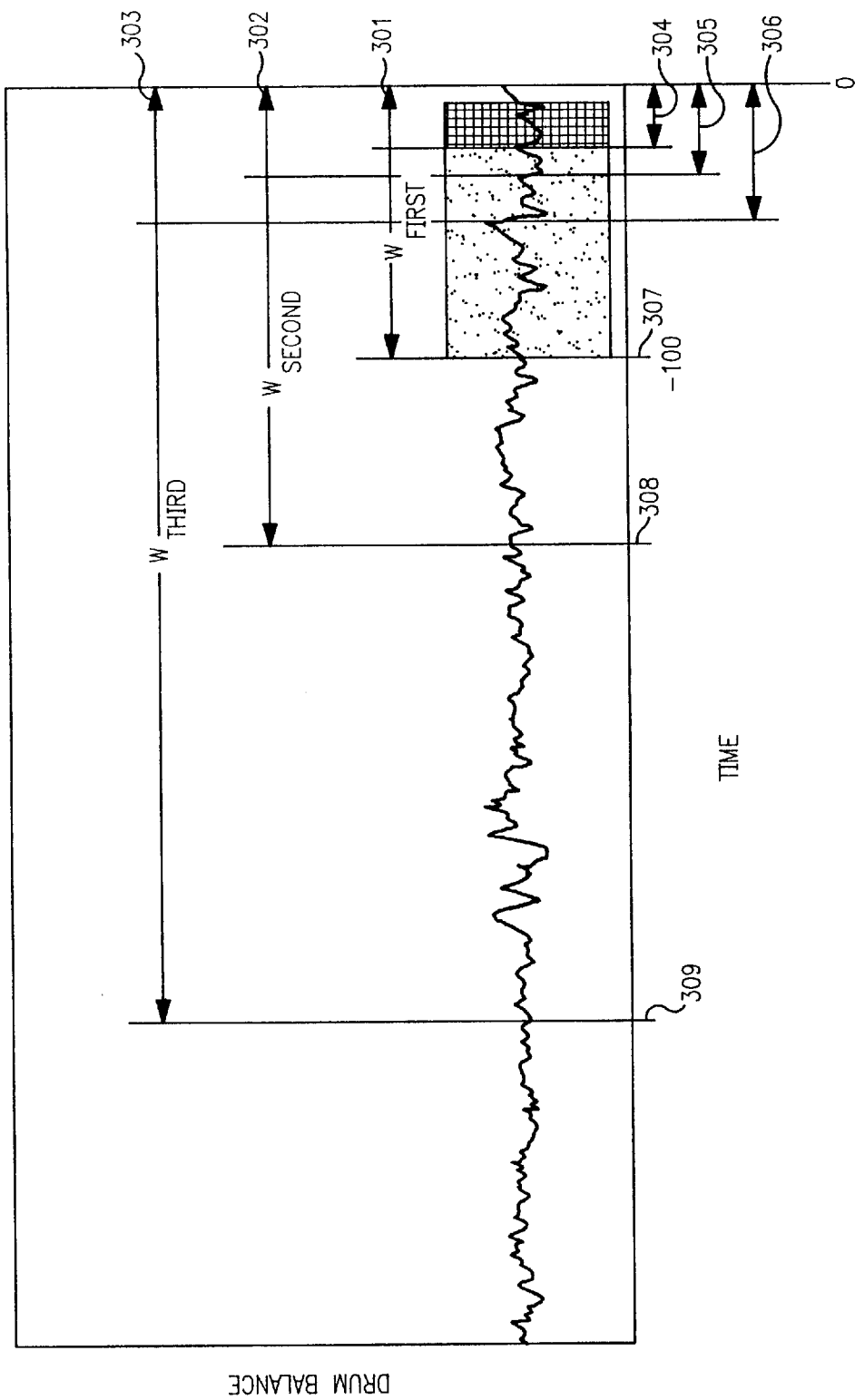
FIG. 3 is a chart showing drum balances over time in relation to various time frames.

Rather than relying on a single pair of short and long term average drum balances, a preferred embodiment of the present invention uses a plurality of independent pairs to monitor a boiler system. Each pair corresponds to a short and long term average drum balance taken over a distinct short and long duration respectively. For example, FIG. 3 depicts drum balance data over time in relation to a leak detection system having three independent window pairs, a first 301, second 302, and third 303. The right side of the chart indicates time zero or present time, and towards the left side of the chart, the drum balance data becomes more dated. It should be apparent from the depiction of FIG. 3 that with every update, drum balance datum enters the window pairs simultaneously from the right, while various older drum balance data exit the window pairs to their left. The duration that a particular drum balance datum remains in a window pair depends entirely on the window size. The data that is contained in a given window is its data sampling. The first window pair 301 corresponds to a short term average drum balance that extends back in time for a short duration 304. The short term average drum balance of the second window pair 302 extends back in time for a short duration 305 which is longer than the short duration 304. Likewise, the third window pair 303 corresponds to a short term average drum balance that extends back in time for a short duration 306 which is longer yet than that the short duration 305. The long term average drum balances corresponding to the first 301, second 302, and third 303 window pairs extend back for long durations 307, 308, and 309 respectively. As with the short durations, the long durations differ from one another— the long term duration 309 of the third window pair extending the furthest back in time.

Multiple window pairs allow the system to strike a balance between responsiveness and accuracy. A shorter window pair, or time frame, allows for a relatively quick indication of a leak. However, the risk of a false alarm is greater due to its relatively small sampling failing to transcend an otherwise benign system fluctuation. On the other hand, a longer time frame involves a greater sampling size and tends to reduce the effects of transient fluctuations. The cost of such accuracy, however, is decreased response time to a leak. Therefore, the present invention provides for a variety of time frames to satisfy response time and accuracy needs.

The short duration over which a particular short term average is calculated, or, in other words, the number of drum balance data considered, preferably relates to the cyclic tendency of the drum balances. Due to various operating conditions such as pumps turning on/off and changing steam demands, the drum balance tends to cycle. It is therefore preferred that the short term average drum balances are taken over a period corresponding to a portion of a drum balance cycle that roughly provides a range of drum balance magnitudes expected to occur in a typical cycle. In this way, the short term average drum balance includes both cyclic highs and lows, and consequently, tends to avoid false leak indications caused by ordinary cycling.

The drum balance cycle can be determined either by examining the drum balances over time, or by periodically calculating it in controller 34 using contemporaneous, on-line, drum balance data. It is preferred that the latter be implemented to update the cycle periodically. This task can be undertaken using known correlation or curve fitting software. By having the drum balance cycle updated periodically, the system can adjust the short term drum balance averages to cover relevant portions of the cycle as discussed above.

The long duration over which a particular long term average is taken depends in part upon the short duration of its paired short term average. That is, the long term average should be long enough to transcend operational conditions affecting the short term average, but not so long as to average-out all drum balance anomalies. As used in this disclosure, R refers to the ratio of $N_2$ divided by $N_1$. It has been found that a preferred R or the ratio of $N_2$ to $N_1$ is about 8:1 to about 12:1, and, more preferably, about 10:1. Moreover, with particular regard to longer time frames, it may be beneficial to extend the long term average beyond a typical work shift. This way, operational differences between different shifts can be averaged out thereby reducing the likelihood of a false positive alarm signal.

Referring back to FIG. 3, in a preferred system having three independent time frames, the first 301, second 302 and third 303 window pairs have short durations corresponding to approximately one quarter, one half and a full boiler cycle respectively. The long durations are approximately ten times as long. Thus, in a system with a drum balance cycle of approximately 40 minutes, controller 36 conducts short term averaging over 10, 20, and 40 minute durations for the first, second and third time frames respectively. The long term average drum balances would be calculated over approximately 100, 200, and 400 minute durations for the first, second, and third time frames respectively. It may be beneficial to extend the long duration of the third time frame to approximately 600 minutes, or so, to span between multiple operation shifts. With sampling every 5 seconds, $N_1$ and $N_2$ would be 120 and 1200 for the first time frame respectively. The numbers of drum balance data used in the second and third time frames would be calculated in a similar manner.

After calculating long and short term drum balance averages $\overline{DB_1}$ and $\overline{DB_2}$ for each time frame, controller 36 calculates leakage Δ from recovery boiler system 12 for each sampling period for each time frame using the following calculation in Block 103:

$$\Delta = |\overline{DB_1} - \overline{DB_2}|$$ Equation (6)

In Block 104, the controller 36 next compares the calculated leak flow rate Δ with a predetermined maximum limit $\Delta_{max}$ in Block 106. If Δ does not exceed $\Delta_{max}$, then the process waits until the drum balance is updated and recalculates Δ.

If $\Delta_{max}$ is exceeded, however, then the controller 36 calculates the pooled standard deviation of the long and short term averages in Block 105. To this end, the controller 36 first calculates the standard deviations $\sigma_1$, $\sigma_2$ for the short and long term samples of each time frame, respectively, using equations (6) and (7):

$$\sigma_1 = \sqrt{\frac{\sum_{i=T_s-N_1}^{N_1} (DB(i) - \overline{DB_1})^2}{N_1 - 1}}$$ Equation (7)

$$\sigma_2 = \sqrt{\frac{\sum_{i=T_s-N_2}^{N_2} (DB(i) - \overline{DB_2})^2}{N_2 - 1}}$$ Equation (8)

The controller 36 then calculates the pooled estimated standard deviation $\varsigma$ for the entire data set for each time frame in Block 104 using the following equation:

In Block 106, the significant level of the difference between average short term drum balance and the average long term drum balance for each time frame is determined $$\overline{S} = \sqrt{\frac{(N_1 - 1)\sigma_1^2 + (N_2 - 1)\sigma_2^2}{(N_1 - 1) + (N_2 - 1)}} \quad \text{Equation (9)}$$

using $t_{test}$, which is calculated in controller 36 using the following equation:

$$t_{test} = \frac{|\overline{DB_1} - \overline{DB_2}|}{\overline{S}\sqrt{\frac{1}{N_1} + \frac{1}{N_2}}} \quad \text{Equation (10)}$$

Those skilled in the art of statistics will recognize that $t_{test}$ provides an important correlation between the sampling size and the certainty that a difference is real as opposed to just random anomalies or "noise."

The controller 36 in Block 107 determines whether $t_{test}$ exceeds a predetermined maximum, $t_{max}$. In an earlier embodiment of the invention, an alarm would be signaled if the $t_{max}$ was exceeded. An improvement to this method, however, involves determining whether a number of significant differences reaches a predetermined limit before signalling an alarm. This predetermined limit is user defined and may include a given number of significant differences over a certain period, a particular pattern of significant differences, or a predetermined succession of significant differences. Of these, a predetermined limit of consecutive significant differences is preferred. A succession of significant differences in the average drum balances offers a higher degree of reliability that a leak actually exists than just one occurrence. By analogy, flipping a coin just once indicates very little about its tendency to be fair and land either heads-up or heads-down with equal probability. If, on the other hand, a coin is flipped repeatedly and continues to land heads-up, the likelihood that the coin is improper increases exponentially as the succession of heads-up landings increases.

By increasing the reliability of an alarm condition, the improved system offers two distinct advantages over the prior art. First, higher reliability equates to fewer false alarms. False alarms may not only precipitate a costly shut-down, but also "desensitize" the operators causing them to react indifferent to a real leak. Second, higher reliability allows for a more sensitive system. That is, since the chance of a false alarm is greatly diminished, the $t_{max}$ can be lower. It need not be maintained at a relatively high level to act filter for peak normal values.

Referring back to FIG. 2, if $t_{test}$ is not greater than $t_{max}$ in Block 107, then controller 36 resets the number or the indicator of consecutive significant differences (n) to zero in Block 108, and waits to repeat the above-described calculations with respect to the data which is received from the sensors 28, 30, 32, and 34 in the next sampling period. On the other hand, if $t_{test}$ is greater than $t_{max}$, controller 36 increases the number of significant differences by one in Block 109, and then determines whether a predetermined succession of significant differences has been reached in Block 110. If the number of significant differences is reached, however, an alarm 38 is signaled in Block 111.

The alarm can be audio, visual or both. Moreover, in the embodiment using multiple time frames, a different alarm condition should be indicated for a particular time frame. For example, in shorter time frames, the alarm should indicate that a potential leak has been detected. This puts the operators on notice that a leak is likely, and affirmative action should be taken such as inspecting the boiler for confirmation. As the anomalous drum balance data subsequently affect the longer time frames thereby triggering their alarms, the condition should be treated as much more serious. A long term alarm may require emergency action such as shutting off the feed water.

In one embodiment of the invention, the leak detection system not only signals an alarm condition, but also takes action to avert a catastrophic boiler failure. Referring to Block 112 in FIG. 2, controller 36 calculates leakage rate Δ for the next data set in Block 112, and for subsequent data sets. At the end of such calculations, controller 36 will determine if the calculated leakage rate A has increased with respect to previous measurements in Block 113. If Δ has not increased, the process is repeated. If Δ does increase, controller 36 then determines if a predetermined minimum time $T_B$ has elapsed in Block 114. If time equal to $T_E$ has not elapsed, the sampling and calculation process is again repeated. If a period of time greater than Te has elapsed, controller 36 in Block 115 will activate shutoff valve 42 in feed water line 18, to cut off feed water to the recovery boiler 14, thereby shutting down the recovery boiler system 12 automatically. Thus, if the leakage rate continues to increase over a predetermined period of time without human intervention, system 10 act to automatically prevent a leak created explosion from taking place in the recovery boiler system 12.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for detecting a leak in a boiler system of the type having a boiler drum wherein a drum balance is determinable, said method comprising the steps of:

(a) calculating at least a first pair of short and long term averages and a second pair of short and long term averages; said short and long term averages of said first pair being based on a certain number of drum balance data, $N_1$ and $N_2$, respectively, wherein $N_1$ is less than $N_2$; said short and long term averages of said second pair being based on a certain number of drum balance data, $N_1'$ and $N_2'$ respectively, wherein $N_1'$ is less than $N_2'$; and wherein $N_2$ is less than $N_2'$;

(b) calculating a difference between each pair of step (a);

(c) determining if a difference calculated in step (b) is significant according to its $t_{test}$; and (d) indicating a leak if a difference is significant according to step (c), wherein an indication of a leak is associated with a confidence level, said confidence level being higher for a significant difference based on said second pair relative to a significant difference based on said first pair.

2. The method of claim 1, wherein the duration over which drum balance data is generated for a short term average corresponds to a portion of a drum balance cycle which approximately includes a range of drum balance magnitudes representative of a typical drum balance cycle.

3. The method of claim 2, wherein the ratios of $N_1$ to $N_2$ and $N_1'$ to $N_2'$ are about 1:8 to about 1:12.

4. The method of claim 1, wherein in step (a) a third pair of said short and long term averages is calculated; said short and long term averages of said third pair based on a certain number of drum balance data, $N_1''$ and $N_2''$ respectively, wherein $N_1''$ is less than $N_2''$; and wherein $N_{2'}$ is less than $N_2''$.

5. The method of claim 4, wherein the durations over which drum balance data is generated for the short term averages of said first, second and third pairs correspond to approximately one quarter, one half and a whole drum balance cycle, respectively.

6. The method of claim 5, wherein the ratios of $N_1$ to $N_2$ and $N_1'$ to $N_2'$ and $N_1''$ to $N_2''$ are about 1:8 to about 1:12.

7. The method of claim 4, wherein the duration over which drum balance data is generated for the long term average drum balance of said third pair corresponds to a period longer than a working shift.

8. The method of claim 1, further comprising
   (e) reiterating steps (a), (b), and (c) at least once wherein each reiterated pair of short and long term averages includes at least one drum balance datum that is more recent than any datum on which a previously calculated short and long term average is based; and
   wherein indicating a leak in step (d) comprises monitoring a pattern of significant differences calculated in step (c) and indicating a leak when said pattern exceeds a predetermined limit.

9. The method of claim 8, wherein said predetermined limit is one.

10. The method of claim 8, wherein said predetermined limit is selected from the group consisting of two or more significant differences with a certain period and two or more consecutive significant differences.

11. A method for detecting a leak in a boiler system of the type having a boiler drum wherein a drum balance is determinable, said method comprising the steps of:
   (a) calculating a pair of short and long term averages, said short term average based on a certain number of drum balance data, and said long term average based on a certain number of drum balance data, wherein the number of drum balance data of said short term average is less than the number of drum balance data of said long term average;
   (b) calculating a difference between each pair in step (a);
   (c) determining if a difference in step (b) is significant according to its $t_{test}$;
   (d) reiterating steps (a), (b), and (c) at least once wherein each reiterated pair of short and long term averages includes at least one drum balance datum that is more recent than any datum on which a previously calculated short and long term average is based; and
   (e) monitoring a pattern of significant differences calculated in step (c) and indicating a leak if said pattern exceeds a predetermined limit, wherein said predetermined limit is selected from the group consisting of two or more significant differences within a certain period and two or more consecutive significant differences.

12. The method of claim 11, wherein in step (a) more than one pair of short and long term averages is calculated, each pair having a different number of drum balance data included in at least the long term average; and wherein in step (e) an indication of a leak is associated with a confidence level, said confidence level being relatively higher for a significant difference based on a pair including a relatively greater number of drum balance data in its long term average.

13. The method of claim 11, wherein said predetermined limit is two or more consecutive significant differences.

14. The method of claim 13, wherein an indication of a leak is associated with a confidence level, said confidence level increasing as the number of consecutive significant differences increases.

15. An apparatus for detecting a leak in a boiler system of the type having a boiler drum wherein a drum balance is determinable, said apparatus comprising:
   (a) means for calculating at least a first pair of short and long term averages and a second pair of short and long term averages; said short and long term averages of said first pair being based on a certain number of drum balance data, $N_1$ and $N_2$, respectively, wherein $N_1$ is less than $N_2$; said short and long term averages of said second pair based on a certain number of drum balance data, $N_1'$ and $N_2'$ respectively, wherein $N_1'$ is less than $N_2'$; and wherein $N_2$ is less than $N_2'$;
   (b) means for calculating a difference between each pair of step (a);
   (c) means for determining if a difference calculated in step (b) is significant according to its $t_{test}$; and
   (d) means for indicating a leak if a difference is significant according to step (c), wherein an indication of a leak is associated with a confidence level, said confidence level being higher for a significant difference based on said second pair relative to a significant difference based on said first pair.

16. The apparatus of claim 15, wherein means for indicating a leak comprises monitoring a pattern of significant differences and indicating a leak when said pattern exceeds a predetermined limit.

17. The apparatus of claim 15, wherein a third pair of said short and long term averages is calculated; said short and long term averages of said third pair based on a certain number of drum balance data, $N_1''$ and $N_2''$ respectively, wherein $N_1''$ is less than $N_2''$; and wherein $N_{2'}$ is less than $N_2''$.

18. A system for detecting a leak in a boiler system of the type having a boiler drum wherein a drum balance is determinable, said system comprising a computer program for performing the steps of:
   (a) calculating at least a first pair of short and long term averages and a second pair of short and long term averages; said short and long term averages of said first pair being based on a certain number of drum balance data, $N_1$ and $N_2$, respectively, wherein $N_1$ is less than $N_2$; said short and long term averages of said second pair based on a certain number of drum balance data, $N_1'$ and $N_2'$ respectively, wherein $N_1'$ is less than $N_2'$; and wherein $N_2$ is less than $N_2'$;
   (b) calculating a difference between each pair of step (a);
   (c) determining if a difference calculated in step (b) is significant according to its $t_{test}$; and
   (d) indicating a leak if a difference is significant according to step (c), wherein an indication of a leak is associated with a confidence level, said confidence level being higher for a significant difference based on said second pair relative to a significant difference based on said first pair.

19. The system of claim 18, wherein said computer program further comprising instructions for:
   (d) reiterating steps (a), (b), and (c) at least once wherein each reiterated pair of short and long term averages includes at least one drum balance datum that is more recent than any datum on which a previously calculated short and long term average is based; and
   wherein indicating a leak in step (d) comprises monitoring a pattern of significant differences calculated in step (c)

and indicating a leak when said pattern exceeds a predetermined limit.

20. The system of claim 18, wherein, in step (a), a third pair of said short and long term averages is calculated; said short and long term averages of said third pair based on a certain number of drum balance data, $N_1''$ and $N_2''$ respectively, wherein $N_1''$ is less than $N_2''$; and wherein $N_2$ is less than $N_2''$.

* * * * *